J. E. Tucker,
Shoeing Horses.
No. 61,897.    Patented Feb. 5, 1867.

Witnesses:
F. A. Jackson
Jas. A. Service

Inventor:
J. E. Tucker
Per Munn & Co.
Attorneys

United States Patent Office.

JOHN E. TUCKER, OF MONTFORT, WISCONSIN, ASSIGNOR TO HIMSELF, THOMAS TUCKER, J. H. LINCOLN, AND A. P. HAMMON.

*Letters Patent No. 61,897, dated February 5, 1867.*

IMPROVED FOOT-REST FOR HORSES.

*The Schedule referred to in these Letters Patent and making part of the same.*

TO ALL WHOM IT MAY CONCERN:

Be it known that I, JOHN E. TUCKER, of Montfort, in the county of Grant, and State of Wisconsin, have invented a new and useful Improved Foot-Rest for Horses; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

Figure 1:
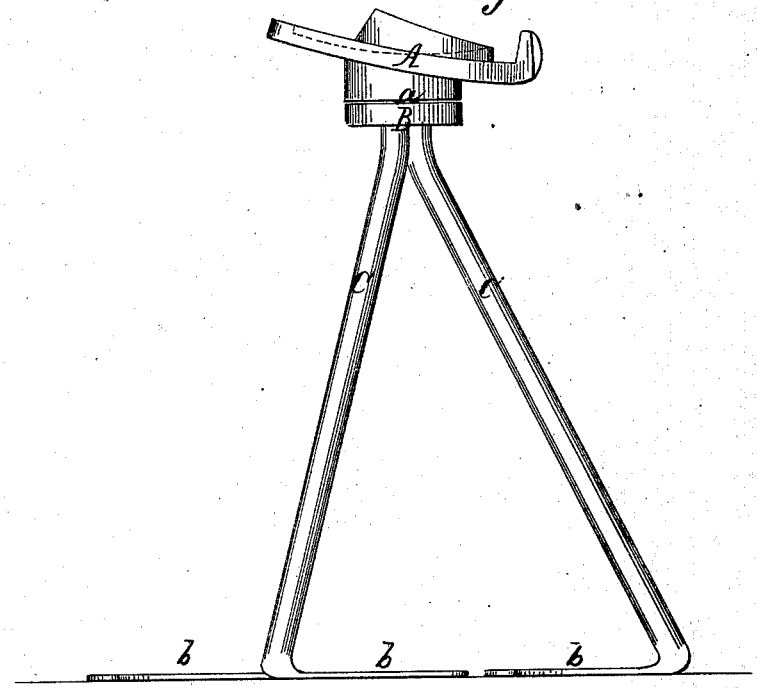
Figure 1 is a side elevation of my invention.
Figure 2:
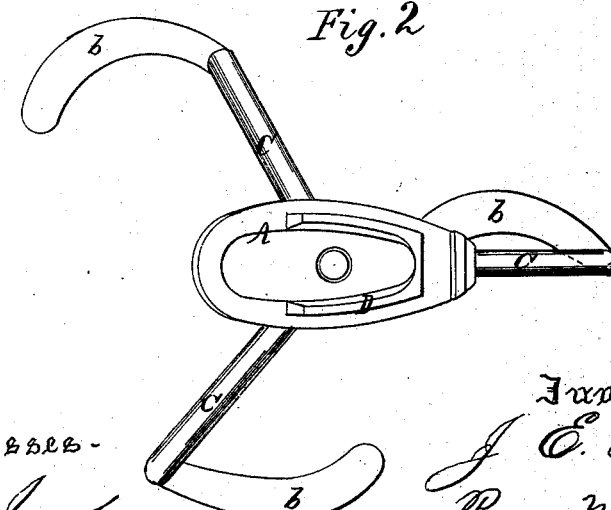
Figure 2 is a plan or top view of the same.

My invention is designed for a rest or block on which to place a horse's foot whilst dressing the hoof, clenching the nails, etc., in horse-shoeing.

The invention consists in a revolving foot-rest mounted upon a suitable stool or support, whose legs are provided with feet whereby the device may be more readily held to the ground by the foot of the blacksmith or other person using the device.

A designates a foot-rest for the horse; this is arranged to revolve on a pivot, $a$, which is affixed in a block, B. The block B is supported in the present instance upon three legs C C C, each of which is provided with feet $b\ b\ b$, the said feet being bent around so as to be out of the way. These feet not only give a firmer support to the device, but they are so arranged that the blacksmith or person who operates upon the horse's hoof can press with his boot upon one of these feet, and thus hold the device more securely in position. The foot-rest A is hollowed out so that it corresponds in a measure to the hoof of the horse when laid sidewise therein for the purpose of trimming it or affixing the shoe. Upon the top of this foot-rest A there is a nearly semicircular metallic strip D; in other words, it is of a shape so that when the horse's shoe is placed thereon, it will constitute a metallic base along under the heads of the nails to hold them whilst the points are being clenched. Thus it will be seen that by this simple arrangement, which is light and very portable, the greater part of the work of a blacksmith in shoeing horses may be performed with ease and rapidity, and the hoof being held by a flange on the piece or strip C, the blacksmith will be saved the labor of holding the foot of a restless horse between his legs, as is the usual practice.

What I claim as new, and desire to secure by Letters Patent, is—

The device herein described for blacksmith's use in shoeing horses, said device consisting of the foot-rest A, supported on the block B, so as to revolve, the legs C having feet $b$, all constructed and arranged substantially as shown and described.

JOHN E. TUCKER.

Witnesses:
THOMAS LAIRD,
E. BELL.